(12) United States Patent
Aaron

(10) Patent No.: US 8,862,567 B2
(45) Date of Patent: Oct. 14, 2014

(54) METHODS, SYSTEMS, AND COMPUTER PROGRAM PRODUCTS FOR DISCREETLY MONITORING A COMMUNICATIONS NETWORK FOR SENSITIVE INFORMATION

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2379 days.

(21) Appl. No.: 10/969,824

(22) Filed: Oct. 21, 2004

(65) Prior Publication Data
US 2006/0100990 A1    May 11, 2006

(51) Int. Cl.
*G07F 17/30* (2006.01)
*H04L 29/06* (2006.01)

(52) U.S. Cl.
CPC ...................... *H04L 63/00* (2013.01)
USPC ........................................................ 707/707

(58) Field of Classification Search
CPC .................... G07F 17/30864; G07F 17/30029; G07F 17/30424; G07F 17/30477; G07F 17/30657; G07F 17/30964
USPC ........................................................ 707/707
See application file for complete search history.

(56) References Cited

U.S. PATENT DOCUMENTS

| | | | | |
|---|---|---|---|---|
| 5,802,515 | A * | 9/1998 | Adar et al. | 707/5 |
| 6,275,824 | B1 * | 8/2001 | O'Flaherty et al. | 707/707 |
| 6,532,459 | B1 * | 3/2003 | Berson | 707/707 |
| 6,594,662 | B1 * | 7/2003 | Sieffert et al. | 707/10 |
| 6,631,482 | B1 * | 10/2003 | Marks | 714/45 |
| 2001/0056546 | A1 * | 12/2001 | Ogilvie | 713/200 |
| 2002/0024947 | A1 * | 2/2002 | Luzzatti et al. | 370/352 |
| 2002/0073065 | A1 * | 6/2002 | Inaba et al. | 707/1 |
| 2002/0174115 | A1 * | 11/2002 | shibuya et al. | 707/3 |
| 2003/0088547 | A1 * | 5/2003 | Hammond | 707/3 |
| 2004/0078816 | A1 * | 4/2004 | Johnson | 725/52 |
| 2004/0181670 | A1 * | 9/2004 | Thune et al. | 713/176 |
| 2005/0210056 | A1 * | 9/2005 | Pomerantz et al. | 707/101 |
| 2009/0083290 | A1 * | 3/2009 | Gailey et al. | 707/707 |

OTHER PUBLICATIONS

Asonov, Dimitr and Johann-Christoph Freytag. "Repudiative Information Retrieval." Proceedings of the 2002 ACM workshop on Privacy in the Electronic Society. Nov. 2002: 32-40. Washington DC. ISBN: 1-58113-633-1.*
Asonov, Dimitri. "Private Information Retrieval—An Overview and Current Trends." Proceedings of the ECDPvA Workshop, Informatika 2001, Vienna Austria, Sep. 2001.*
<http://web.archive.org/web/20001205040600/http://www.us-search.com/ > An archived web page of USSearch.com from Dec. 5, 2000, discloses a web site search engine that will search for a subscriber's personal information.*
Chor, Benny, Oded Goldreich, Eyal Kushilevitz, and Madhu Sudan. "Private Information Retrieval." Journal of the ACM, vol. 45, No. 6, Nov. 1998: 965-982.*
Goldberg, Ian, David Wagner, and Eric Brewer. "Privacy-enhancing technologies for the Internet." University of California, Berkeley. 1997: 1-11. <http://www.cs.berkeley.edu/~daw/papers/privacy-compcon97-www/privacy-html.html>.*

* cited by examiner

*Primary Examiner* — Robert Beausoliel, Jr.
*Assistant Examiner* — Alexandria Bromell
(74) *Attorney, Agent, or Firm* — Myers Bigel Sibley & Sajovec, PA

(57) ABSTRACT

A method for monitoring a network for information includes repeatedly searching the network for sensitive information about a subscriber. The network is intermittently searched for obscuring information during the repeated searching to thereby disguise the sensitive information that is the target of the repeated searching. Related systems and computer program products are also discussed.

18 Claims, 7 Drawing Sheets

METHODS, SYSTEMS, AND COMPUTER PROGRAM PRODUCTS FOR DISCREETLY MONITORING A COMMUNICATIONS NETWORK FOR SENSITIVE INFORMATION

FIELD OF THE INVENTION

The present invention relates to communications networks, and, more particularly, to monitoring communications networks for information.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. Specifically, Web browsers and software applications send a request over the WWW to a server, requesting a Web page identified by a Uniform Resource Locator (URL), which notes both the server where the Web page resides and the file or files on that server which make up the Web page. The server then sends a copy of the requested file(s) to the Web browser, which in turn displays the Web page to the user.

The topology of the World Wide Web can be described as a network of networks, with providers of network services called Network Service Providers, or NSPs. Servers that provide application-layer services may be referred to as Application Service Providers (ASPs). Sometimes a single service provider provides both functions.

With the advent of the Internet and refinement of database technologies, vast amounts of data may be disseminated and/or accessed using the Web. Search engines often are utilized to facilitate searching for desired information among these large collections of data. Exemplary search engines include the Google™ search engine and the MSN Search feature of the Microsoft Internet Explorer browser.

Considering the public accessibility the Web, individuals, groups, and organizations may be concerned with privacy and the protection of sensitive and/or private information. As such, reasonable protections may be used when transmitting such information over the Web. Yet, in some cases these protections may fail, and sensitive information may be undesirably stolen, lost, or otherwise disseminated so as to be obtainable by unauthorized third parties. By detecting this dissemination of sensitive information, steps may be taken to limit potential damage. However, the act of searching for information, such as sensitive information, may inadvertently disclose the information that is the target of the search. Information may be disclosed directly by the specified search terms themselves, or indirectly by inferences based on one or more of the search items specified.

SUMMARY OF THE INVENTION

According to some embodiments of the present invention, a method for monitoring a network for information may include repeatedly searching the network for sensitive information about a subscriber, and intermittently searching the network for obscuring information during the repeated searching to disguise the sensitive information.

In other embodiments, the method may further include populating a database with sensitive information about a subscriber and randomly-generated obscuring information to produce expanded subscriber information, and repeatedly searching the network for the expanded information from the database. Repeatedly searching for the expanded information may include repeatedly searching for the sensitive information and intermittently searching for the obscuring information.

In other embodiments, the method may include obtaining the sensitive information for the repeated searching from a subscriber, randomly-generating the obscuring information for the intermittent searching, expanding the sensitive information with the obscuring information to generate target information; and repeatedly searching the network for the target information. Repeatedly searching for the target information may include repeatedly searching for the sensitive information and intermittently searching for the obscuring information.

In other embodiments, the method may include identifying search results containing sensitive information from results of the repeated and intermittent searching based on the sensitive information obtained from the subscriber, and reporting the identified search results to the subscriber.

In still other embodiments, repeatedly searching may include searching for additional information about the subscriber if the sensitive information from the subscriber is found.

In still other embodiments, expanding the sensitive information with the obscuring information may include augmenting the sensitive information about the subscriber with information about other subscribers and/or randomly-generated information about non-existent subscribers and/or public information about non-subscribers.

In further embodiments, repeatedly searching for the expanded information includes populating a database with sensitive information about a plurality of subscribers and randomly-generated obscuring information to produce expanded information for each of the plurality of subscribers. Repeatedly searching for the expanded information may further include repeatedly searching for expanded information for a first subscriber and intermittently searching for expanded information for a second subscriber.

In further embodiments, obtaining the sensitive information from the subscriber includes obtaining preference information from the subscriber as to a degree of privacy for the sensitive information.

In other embodiments, repeatedly searching is performed periodically, continuously, and/or at random intervals.

In other embodiments, repeatedly searching includes a delay between related search requests, and wherein intermittently searching is performed during the delay.

In still other embodiments, identifying search results containing sensitive information from results of the repeated and intermittent searching includes excluding search results specified by the subscriber and/or a system administrator, and comparing remaining search results with the sensitive information obtained from the subscriber to identify the search results containing sensitive information.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
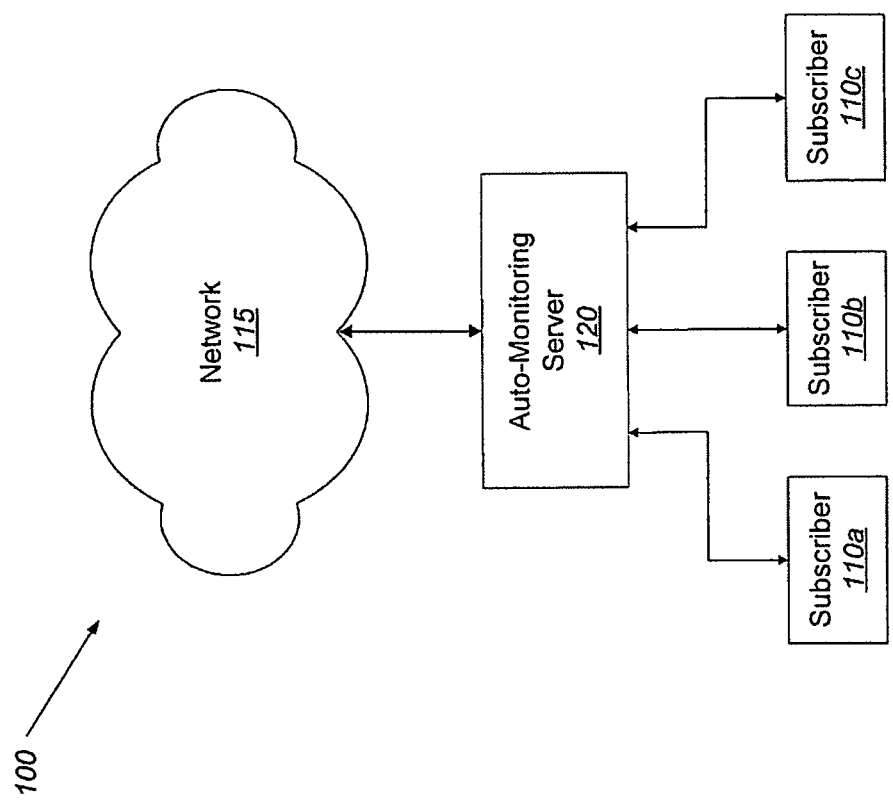
FIG. 1 is a block diagram that illustrates a system for monitoring a communications network for sensitive information in accordance with some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. As used herein, the term "and/or" includes any and all combinations of one or more of the associated listed items.

The present invention may be embodied as systems, methods, and/or computer program products. Accordingly, the present invention may be embodied in hardware and software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain and/or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to automatically monitoring a network for private and/or sensitive information. It will be understood that the present invention is not limited to such embodiments but may also be embodied generally as monitoring for any specified information across a communication network.

Referring now to FIG. 1, an exemplary network architecture 100 for automatically monitoring for private and/or sensitive information, in accordance with some embodiments of the present invention, comprises a plurality of subscribers 110a, 110b, and 110c, connected to a communications network 115 and an auto-monitoring system or server 120. The network 115 may represent a global network, such as the Internet, or other publicly accessible network. The network 115 may also, however, represent a wide area network, a local area network, an Intranet, or other private network, which may not be accessible by the general public. Furthermore, the network 115 may represent a combination of one or more wired and/or wireless public and/or private networks and/or virtual private networks (VPN).

The auto-monitoring server 120 may be embodied as one or more enterprise, application, personal, pervasive and/or embedded computing devices that may be interconnected by a wired and/or wireless local and/or wide area network, including the Internet. In some embodiments, the auto-monitoring server 120 may be situated in a secure location, such as the central office of a communications services provider. Although FIG. 1 illustrates an exemplary communications network, it will be understood that the present invention is not limited to such configurations, but is intended to encompass any configuration capable of carrying out the operations described herein.

Figure 2:
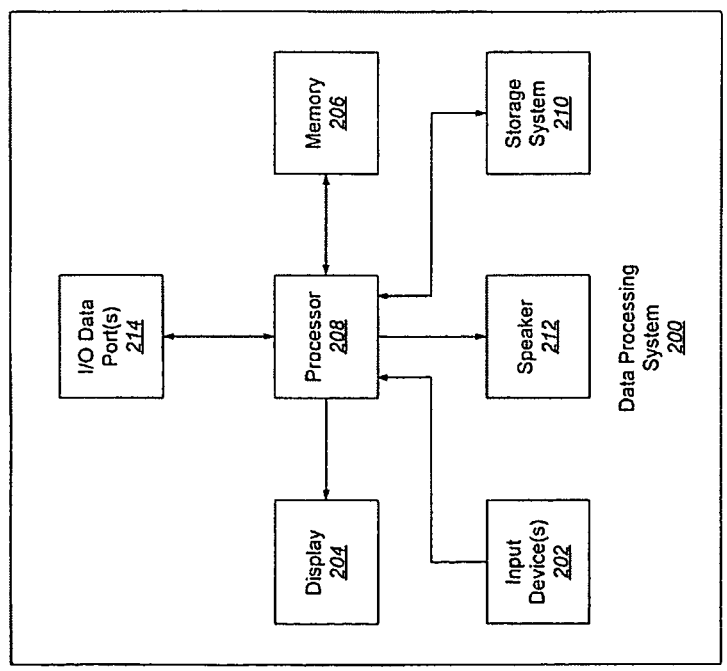
FIG. 2 illustrates a data processing system that may be used to implement a system for monitoring a communications network for sensitive information in accordance with some embodiments of the present invention.

Referring now to FIG. 2, a data processing system 200 that may be used to implement the auto-monitoring server 120 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein.

Figure 3:
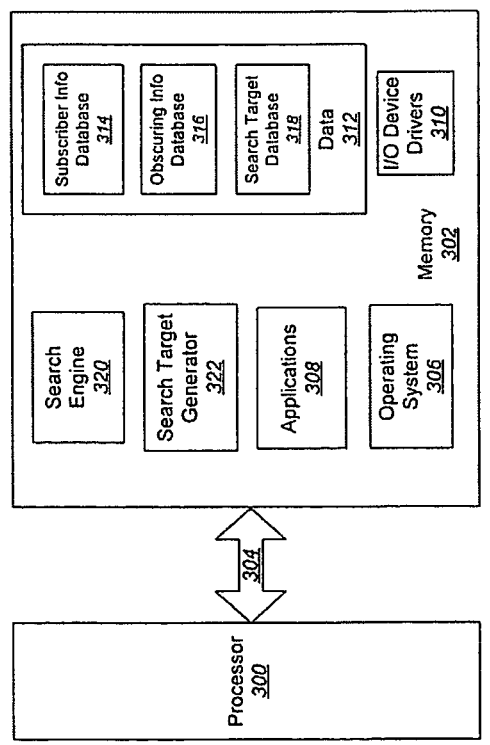
FIG. 3 is a block diagram that illustrates a software architecture for a system for monitoring a communications network for sensitive information in accordance with some embodiments of the present invention.

FIG. 3 illustrates a processor 300 and memory 302 that may be used in embodiments of methods, systems, and computer program products for monitoring a communications network for sensitive information in accordance with some embodiments of the present invention. For example, in some embodiments of the present invention, the processor 300 and memory 302 may be used to embody the processor 208 and the memory 206, respectively, of FIG. 2 in the auto-monitoring server 120 of FIG. 1. The processor 300 communicates with the memory 302 via an address/data bus 304. The processor 300 may be, for example, a commercially available or custom microprocessor. The memory 302 is representative of the overall hierarchy of memory devices containing the software and data used to discreetly monitor a communications network for private and/or sensitive information in accordance with some embodiments of the present invention. The memory 302 may include, but is not limited to, the following types of devices: cache, ROM, PROM, EPROM, EEPROM, flash, SRAM, and DRAM.

As shown in FIG. 3, the memory 302 may include several categories of software and data: an operating system 306, applications programs 308, input/output (I/O) device drivers 310, and data 312. The operating system 306 controls the operation of the data processing system. In particular, the operating system 306 may manage the data processing system's resources and may coordinate execution of programs by the processor 300. The I/O device drivers 310 typically include software routines accessed through the operating system 306 by the application programs 308 to communicate with devices such as the I/O data port(s) 214 of FIG. 2 and other components of the memory 302. The application programs 308 are illustrative of programs that implement the various features of a data processing system according to embodiments of the present invention, and preferably include at least one application which supports operations for monitoring a network for private and/or sensitive information according to embodiments of the present invention. Finally, the data 312 represents the static and dynamic data used by the application programs 308, the operating system 306, the I/O device drivers 310, and other software programs that may reside in the memory 302.

As is further seen in FIG. 3, the data 312 may include one or more databases which contain search data for monitoring the network for private and/or sensitive information. In particular, the data 312 may include a subscriber information database 314, an obscuring information database 316, and a search target database 318. The subscriber information database 314 may include private and/or sensitive information about each subscriber of the monitoring system, and the obscuring information database 316 may include randomly-generated obscuring information. The search target database 318 may include combinations of the private and/or sensitive subscriber information with the obscuring information which may be used as target data for a search engine. Although the present invention is illustrated with reference to multiple separate databases in FIG. 3, it will be appreciated by those of skill in the art that the subscriber information, the obscuring information, and the search target information may be stored in the memory 302 within a single database.

Still referring to FIG. 3, the application programs 308 may include a search engine 320 and a search target generator 322. The search target generator 322 may be used to generate target data from the data provided by the subscriber information database 314 and the obscuring information database 316. The target data may be stored in the search target database 318. The search engine 320 may be configured to search for the target data stored in the search target database 318 to monitor the network for private and/or sensitive information. More particularly, the search engine 320 may be configured to repeatedly search the network for the sensitive information, and may be further configured to intermittently search the network for the obscuring information during the repeated searching to disguise the sensitive information.

Although FIG. 3 illustrates an exemplary software architecture that may facilitate monitoring a communications network for private and/or sensitive information, it will be understood that the present invention is not limited to such a configuration but is intended to encompass any configuration capable of carrying out the operations described herein. For example, while the present invention is described with reference to the search engine 320 and search target generator 322 as application programs 308, other configurations may also be utilized while still benefiting from the teachings of the present invention. For instance, the search engine 320 and search target generator 322 may also be incorporated into the operating system 306, the I/O device drivers 310, or other such logical division of the memory 302. Alternatively, the search engine 320 may be a publicly available search engine that is used by the data processing system 200 of FIG. 2.

Embodiments of the present invention may take the form of an entirely hardware embodiment, or an embodiment combining software and hardware aspects without departing from the teachings of the present invention. Computer program code for carrying out operations of data processing systems described above with respect to FIGS. 2 and 3 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

According to some embodiments of the present invention, systems, methods and/or computer program products may be provided that can automatically and continuously search a network, such as the Internet, as well as other network-accessible databases, for private and/or sensitive information. The searches can be conducted in a manner that may obscure the private and/or sensitive information that is the true target of the searches.

Figure 4:
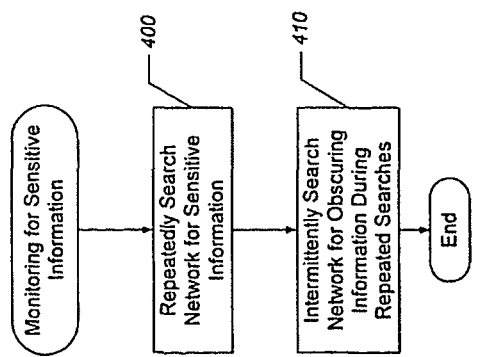
FIG. 4 through FIG. 6 are flowcharts that illustrate operations for monitoring a communications network for sensitive information in accordance with some embodiments of the present invention.

Exemplary operations for monitoring a network for private and/or sensitive information in accordance with some embodiments of the present invention will now be described with reference to the flowcharts of FIG. 4 through FIG. 6. Referring now to FIG. 4, operations begin at block 400 by repeatedly searching a network, such as the communications network 115 of FIG. 1, for private and/or sensitive information about a subscriber. The private and/or sensitive information may include, but is not limited to, name, social security number, nickname, gender, occupation, marital status, home and/or work address, home and/or work and/or cellular telephone number, home and/or work and/or other e-mail addresses, financial account numbers, passwords, financial history, credit rating and/or score, pets owned, cars owned, license numbers, insurance policies, schools attended and degrees and/or certificates earned, past and/or current organizational memberships, hobbies, and identities of family, friends, and/or relatives. Networks to be searched may include public networks, such as the Internet, as well as government and/or private databases in which stolen information may appear. The repeated searching may utilize publicly available search engines or other search engines via special partnerships. The repeated searching may be performed periodically, continuously, and/or at random intervals.

Still referring to FIG. 4, during the repeated searching, the sensitive information that is the target of the repeated searching is disguised by intermittently searching the network for obscuring information at block 410. The obscuring information may be randomly-generated, and may include data in the form and/or structure of the private and/or sensitive information. For example, the obscuring information may be obtained from external sources, such as from information about other subscribers and/or public information regarding others who are non-subscribers. The obscuring information may be randomized by time, punctuation, spelling, foreign language, capitalization, and/or syntax. Also, the obscuring information may include artificially generated information about non-existent or "phantom" subscribers. The obscuring information may also be periodically modified via additions, deletions, and changes made off-line. By intermittently searching for the obscuring information in-between the repeated searches for the sensitive information, it may be more difficult for unauthorized third parties to ascertain information about the subscriber (by eavesdropping and/or other means of gaining knowledge) from the search requests and/or associated responses.

Figure 5:
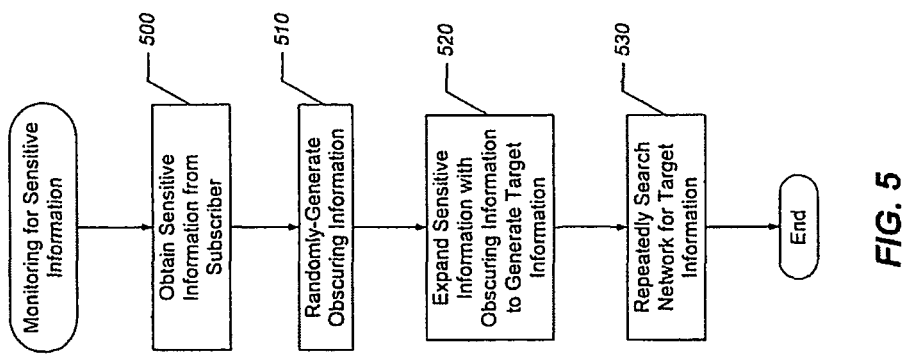

FIG. 5 is a flowchart illustrating additional operations for monitoring a network for private and/or sensitive information in accordance with some embodiments of the present invention. Referring now to FIG. 5, operations begin at block 500 where private and/or sensitive information is obtained from the subscriber. The private and/or sensitive information may include any data for which the subscriber wishes to search, and may be assigned to a unique subscriber identification, rather than to the subscriber's name. The subscriber may also enter any preferences and/or options for the monitoring. For example, the subscriber may desire differing degrees of privacy for the sensitive information that is entered. More particularly, the subscriber may specify a severity associated with each item of sensitive information (e.g., in terms of the potential consequence if the privacy of the information is lost), a degree of preferred obfuscation when searching for each item of sensitive information, and priorities for methods of notification if sensitive information is found. The degree of obfuscation for each search item may also be determined from the associated severity. For example, the degree of obfuscation may be specified to be proportional to the severity, i.e. a greater severity may result in a greater degree of obfuscation. Also, the subscriber may specify to conditionally search for additional information if particular sensitive information is found. Additional preferences may include desired billing methods, service plans, etc.

Still referring to FIG. 5, after the sensitive information is obtained from the subscriber at block 500, obscuring information is randomly-generated at block 510, and the sensitive information is expanded with the obscuring information to generate expanded subscriber information, or target information, at block 520. The target information may include the sensitive information from the subscriber augmented by information about other subscribers and/or public information about non-subscribers and/or randomly-generated information about non-existent subscribers. The sensitive information may be expanded by successive application of parameter variation techniques and/or random number generation in conjunction with word/number lists, dictionaries, and/or other methods of random data generation or generation of data which may appear random. In some embodiments, the obscuring information may be substituted for the sensitive information from the subscriber, in whole or in part, for example, to additionally confuse any eavesdroppers.

The network is then repeatedly searched for the target information at block 530 of FIG. 5. As the target information includes both the sensitive information from the subscriber and the obscuring information, repeatedly searching the network for the target information may include repeatedly searching for the sensitive information and intermittently searching for the obscuring information, as described above with reference to FIG. 4. More particularly, search targets may be chosen from the expanded subscriber information by randomly selecting a different subscriber identification for each subsequent search request. Then, items of the expanded subscriber information associated with the chosen identification are selected, and a search for each selected item is performed. Selecting and searching for expanded subscriber data items may continue until a configurable limit is exceeded, after which the process may be repeated by selecting another subscriber identification. Further randomization of search targets/requests may also be performed so as to further confuse eavesdroppers and/or other unauthorized parties. For instance, a number of different, unrelated sequences of tentative search requests (where each sequence may include a series of related search requests) may be identified before transmission, and requests from each of the different sequences may be randomly interleaved with each other to produce a combined search request sequence which is actually transmitted. This combined search request sequence may include search requests from all of the unrelated sequences interleaved in a randomized order, which may reduce the likelihood that search requests occurring close together in time will be related. As such, the likelihood that an eavesdropper and/or other unauthorized party will be able to make any usable inferences about a subscriber's sensitive information may be further reduced.

Figure 6:
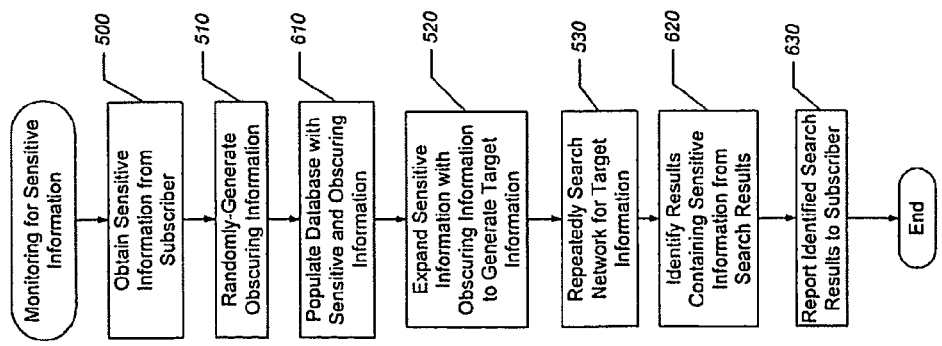

FIG. 6 is a flowchart illustrating further operations for monitoring a network for private and/or sensitive information in accordance with some embodiments of the present invention. Referring now to FIG. 6, after sensitive information is obtained from a subscriber at block 500 and obscuring information is randomly-generated at block 510, a database is populated with the sensitive information and the obscuring information at block 610. The sensitive information and the obscuring information may be stored in a single database, or alternatively, in separate databases. The sensitive information may be stored in an encrypted form and de-crypted when accessed for additional security, so that stolen data may not be usable to unauthorized parties. The sensitive information may also be indexed to a unique subscriber identification, rather than the subscriber's name or other identity information. For example, a "pseudonym" may be used to relate search requests to the pertinent subscriber, which may increase the difficulty of associating the search requests with an actual subscriber if somehow obtained by an unauthorized third party. The subscriber identification may be generated using any sufficiently random method to guarantee uniqueness. For example, a subscriber identification may consist of a randomly-chosen alphanumeric data string, or a cryptographic hash of the subscriber's name and/or related data.

Still referring to FIG. 6, the sensitive information is expanded with the obscuring information in the database to generate expanded subscriber information, or target information, at block 520. The target information may be stored in the database along with the sensitive information and the obscuring information, or alternatively, may be stored in a separate database. The network is then repeatedly searched for the target information from the database at block 530. Once results of the repeated searches have been returned, sensitive information about the subscriber is identified from the search results at block 620. This identified sensitive information is then reported to the subscriber at block 630.

Identifying the sensitive information may include excluding particular search results as specified by the subscriber and/or system administrator, and comparing the remaining results with the sensitive information from the database. For example, identifying the sensitive information may include initial processing of the search results, where imprecise matches may be allowed, and final processing to provide more exact matches.

The initial processing may be used to eliminate obvious inconsistencies and/or false hits. For example, returned data that is merely a part of a larger word or structure may be excluded as a false hit. Similarly, data used in a different context than the sensitive information may also be excluded. Also, the initial processing may be used to filter-out results based on specific exclusions, whether defined by the subscriber and/or by the system configuration. In addition, redundant search results may be filtered out. Wait loops may also be used to disguise any externally-visible artifacts produced by variations in the initial processing that may indicate (to an eavesdropper and/or other unauthorized party) that a received result may be pertinent to sensitive information about the subscriber. For example, a delay may be included between related search requests, and intermittent searching for obscuring information may be performed during the delay to disguise the relationship between the search requests.

The final processing of the search results may be used to compare the remaining search results with the sensitive information actually obtained from the subscriber. If sufficiently precise matches are not found, the remaining search results may be discarded. If the search results contain sufficiently precise matches, this identified sensitive information may be reported to the subscriber. For example, identified "hits" for each item and category of sensitive information may be displayed to the subscriber, as well as the source where each hit was found. The results may also be summarized, such as by total hits, hits in each category, hits for each source, etc. Also, the identified sensitive information found on the network may be displayed in a histogram, such as by item importance, percentage of hits per item, percentage of hits per source, etc.

The flowcharts of FIG. 4 through FIG. 6 illustrate the architecture, functionality, and operations of some embodiments of methods, systems, and computer program products for monitoring a network for private and/or sensitive information. In this regard, each block represents a module, segment, or portion of code, which comprises one or more executable instructions for implementing the specified logical function(s). It should also be noted that in other implementations, the function(s) noted in the blocks may occur out of the order noted in FIG. 4 through FIG. 6. For example, two blocks shown in succession may, in fact, be executed substantially concurrently or the blocks may sometimes be executed in the reverse order, depending on the functionality involved.

Figure 7:
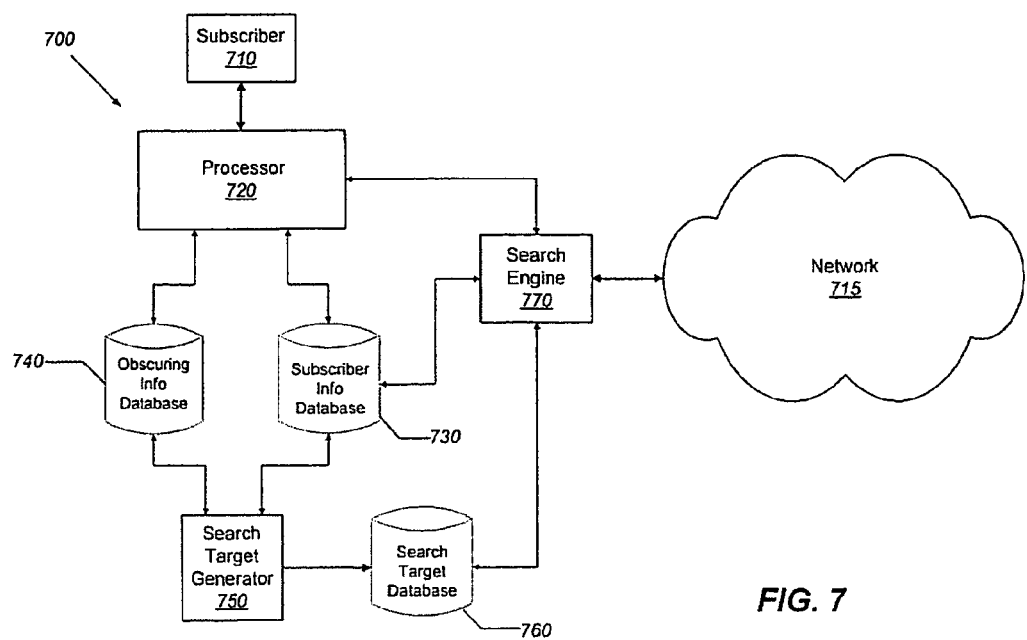
FIG. 7 is a block diagram that illustrates components of a system for monitoring a communications network for sensitive information in accordance with some embodiments of the present invention.

FIG. 7 is a block diagram that illustrates components of a system for monitoring communications networks for sensitive information in accordance with some embodiments of the present invention. As shown in FIG. 7, a system 700 for monitoring communications networks for private and/or sensitive information includes a subscriber 710 who may be interested in learning whether any private and/or sensitive information about the subscriber 710 is present in a network 715. The subscriber 710 forwards such private and/or sensitive information to a server, such as the auto-monitoring server 120 of FIG. 1.

Still referring to FIG. 7, a processor 720 within the server receives the sensitive information and/or any preference information from the subscriber 710. The processor 720 may generate a unique identification for the subscriber 710, and may index the received sensitive information to the unique identification. The sensitive information from the subscriber is stored in a subscriber information database 730. The processor 720 also randomly-generates obscuring information for the subscriber 710, which is stored in an obscuring information database 740. The obscuring information may include large amounts of data similar in structure to the sensitive information received from the subscriber 710, such as sensitive information about other subscribers and/or artificially-generated information about non-existent subscribers.

A search target generator 750 queries the subscriber information database 730 to obtain sensitive data about the subscriber 710, and queries the obscuring information database 740 to obtain the similarly-structured obscuring information. The search target generator 750 then expands the sensitive information from the subscriber 710 with the obscuring information to generate expanded subscriber information, also known as target information. The search target generator 750 may also generate expanded information for non-existent subscribers and/or utilize public information about non-subscribers.

The expanded subscriber information is stored in a search target database 760. A search engine 770 randomly selects items of expanded subscriber information from the search target database 760 and searches the network 715 for the selected items. The search engine 770 may be a publicly available search engine, or another search engine available via a partnership and/or other agreement. As the expanded subscriber information includes both the sensitive information and the obscuring information, the search engine 770 repeatedly searches the network for the sensitive information about a subscriber and intermittently searches the network for the obscuring information during the repeated searching, which may thereby disguise the sensitive information.

The search engine 770 of FIG. 7 may also identify the sensitive information from results of the repeated and intermittent searches based on the expanded subscriber information in the search target database 760 and report the identified private information to the subscriber 710 via the processor 720. In identifying the sensitive information, the search engine 770 may initially filter the search results to eliminate obvious false hits, and may additionally compare the remaining results with the sensitive information from the subscriber information database 730. In some embodiments, the processor 720 may compare the remaining results with the information from the subscriber information database 730 and/or perform additional filtering of the search results. The processor 720 then reports the identified sensitive information to the subscriber 710.

Operations of a system for monitoring communications networks for private and/or sensitive information according to some embodiments of the present invention are illustrated by the following example. A subscriber, such as the subscriber 710 of FIG. 7, signs up with the monitoring service offered by a provider, enters his initial private and/or sensitive information into the provider's website, and sets his system preferences. The subscriber data and/or preferences may be modified by the subscriber at a later time as desired. Upon receiving the subscriber data, an input response processor, such as the processor 720, in an auto-monitoring server, such as the auto-monitoring server 120 of FIG. 1, generates a unique identification for the subscriber, encrypts the private and/or sensitive information from the subscriber, and stores the information in a database, such as the subscriber information database 730. The input response processor also generates obscuring information for the subscriber, and stores the obscuring information in a database, such as the obscuring information database 740.

A target generator, such as the search target generator 750, uses the obscuring information from the database to expand, elaborate, modify, and/or randomize the sensitive information associated with the subscriber's identification to generate expanded subscriber information. In addition, the target generator may create non-existent, or "phantom", customers with associated artificial information and identifications, and expand their information as well. The target generator continually populates a database, such as the search target database 760, with the expanded subscriber information.

A search engine, such as the search engine 770, accesses the expanded subscriber information in the database, and searches Internet web sites, public databases, partner databases, governmental databases, and/or other databases for the expanded subscriber information. Consequently, the search engine intermittently searches for both the sensitive information from the subscriber as well as the obscuring information, thereby disguising the true target of the search to potential unauthorized parties.

Results of the searches are initially processed by the search engine, which deletes any responses associated with the subscriber's identification that it identifies as false hits and/or repetitions. The remaining search results are then compared with the information entered by the subscriber to identify private and/or sensitive information among the results. The private and/or sensitive information identified from the search results is then reported to the subscriber in a variety of forms, dependent upon the subscriber's previously entered preferences. For example, the results may be reported via pager, e-mail, and/or voice-synthesized telephone message. In addition, the results may be illustrated in summaries, histograms, and/or weekly and/or monthly reports to the subscriber. This information may be made available to the subscriber via a password-protected web site. Searches may also be conducted for other subscribers, and the search engine may employ randomization and interleaving as described herein to further confuse any eavesdroppers and/or other third parties who may somehow learn of the search requests and/or responses.

Many variations and modifications can be made to the embodiments described herein without substantially departing from the principles of the present invention. All such variations and modifications are intended to be included herein within the scope of the present invention, as set forth in the following claims.

That which is claimed is:

1. A method for monitoring a computer network for information, comprising:
    obtaining sensitive information about a subscriber;
    repeatedly providing repeated search requests to a search engine to search the network for the sensitive information about the subscriber;
    intermittently providing intermittent search requests to the search engine to search the network for obscuring information in-between the repeated search requests to disguise the sensitive information, the obscuring information comprising information different from the sensitive information about the subscriber that is a subject of the repeated search requests;
    identifying search results containing the sensitive information from results of the repeated and intermittent search requests; and
    reporting the search results that were indentified to the subscriber.

2. The method of claim 1, further comprising:
    populating a database with the sensitive information about the subscriber and randomly-generated obscuring information;
    wherein repeatedly providing the repeated search requests to search for the sensitive information and intermittently providing the intermittent search requests to search for the obscuring information comprises:
    providing a combined search request sequence to the search engine, the combined search request sequence comprising a plurality of search requests for the sensitive information about the subscriber and a plurality of search requests for the obscuring information interleaved between the search requests for the sensitive information.

3. The method of claim 2, further comprising:
    obtaining the sensitive information for the repeated search requests from the subscriber;
    randomly-generating the obscuring information;
    expanding the sensitive information with the obscuring information to generate target information; and
    repeatedly searching the network for the target information,
    wherein repeatedly searching for the target information comprises repeatedly searching for the sensitive information and intermittently searching for the obscuring information responsive to the combined search request sequence.

4. The method of claim 3, wherein expanding the sensitive information with the obscuring information comprises augmenting the sensitive information about the subscriber with information about other subscribers and/or randomly-generated information about non-existent subscribers and/or public information about non-subscribers.

5. The method of claim 3, wherein obtaining the sensitive information from the subscriber further comprises obtaining preference information from the subscriber as to a degree of privacy for the sensitive information.

6. The method of claim 2, wherein populating the database comprises populating the database with sensitive information about a plurality of subscribers and randomly-generated obscuring information to produce expanded information for each of the plurality of subscribers, and wherein the combined search request sequence comprises a plurality of search requests for expanded information for a first subscriber and a plurality of search requests for expanded information for a second subscriber interleaved between the search requests for the expanded information for the first subscriber.

7. The method of claim 1, wherein repeatedly providing the repeated search requests further comprises providing search requests for additional information about the subscriber if the sensitive information from the subscriber is found.

8. The method of claim 1, wherein repeatedly providing the repeated search requests includes a delay between related search requests, and wherein intermittently providing the intermittent search requests is performed during the delay.

9. The method of claim 1, wherein identifying the search results containing the sensitive information further comprises:
excluding search results specified by the subscriber and/or a system administrator; and
comparing remaining search results with the sensitive information obtained from the subscriber to identify the search results containing the sensitive information.

10. A system for monitoring a computer network for information, comprising:
a database stored on a tangible computer readable storage medium populated with sensitive information about a subscriber obtained from the subscriber; and
a search engine stored on a tangible computer readable storage medium configured to perform repeated searches of the network for the sensitive information about the subscriber and further configured to perform intermittent searches of the network for randomly-generated obscuring information during the repeated searches to disguise the sensitive information, the obscuring information comprising information different from the sensitive information about the subscriber that is a subject of the repeated searches,
wherein the search engine is further configured to identify search results containing the sensitive information from results of the repeated and intermittent searches based on the sensitive information in the database and is configured to report the search results that were identified to the subscriber.

11. The system of claim 10, further comprising:
a search target generator configured to generate target information by expanding the sensitive information with the obscuring information, wherein the search engine is configured to repeatedly search the network for the target information responsive to a combined search request sequence comprising a plurality of search requests for the sensitive information about the subscriber and a plurality of search requests for the obscuring information interleaved between the search requests for the sensitive information.

12. The system of claim 11, wherein the database is populated with the sensitive information, the obscuring information, and the target information, and wherein the search engine is further configured to identify search results containing sensitive information from results of the repeated and intermittent searches based on the sensitive information in the database and report the search results that were identified to the subscriber.

13. The system of claim 10, wherein the search engine is configured to include a delay between search requests for related sensitive information, and wherein the search engine is further configured to intermittently search for the obscuring information during the delay.

14. An article of manufacture for monitoring a computer network for information, comprising a computer readable storage medium having computer readable program code embodied therein, the computer readable program code comprising:
computer readable program code configured to obtain sensitive information about a subscriber;
computer readable program code configured to repeatedly provide repeated search requests to a search engine to search the network for sensitive information about the subscriber;
computer readable program code configured to intermittently provide intermittent search requests to the search engine to search the network for obscuring information between the repeated search requests to disguise the sensitive information, the obscuring information comprising information different from the sensitive information about the subscriber that is a subject of the repeated search requests;
computer readable program code configured to identify search results containing the sensitive information from results of the repeated and intermittent search requests based on the obtained sensitive information; and
computer readable program code configured to report the search results that were identified to the subscriber.

15. The article of manufacture of claim 14, further comprising:
computer readable program code configured to obtain the sensitive information for the repeated search requests from the subscriber;
computer readable program code configured to randomly-generate the obscuring information; and
computer readable program code configured to expand the sensitive information with the obscuring information to generate target information;
wherein the computer readable program code configured to repeatedly provide the repeated search requests to search the network for the sensitive information and the computer readable program code configured to intermittently provide the intermittent search requests to search the network for the obscuring information comprises computer readable program code configured to provide a combined search request sequence to the search engine, the combined search request sequence comprising a plurality of search requests for the sensitive information about the subscriber and a plurality of search requests for the obscuring information interleaved between the search requests for the sensitive information.

16. The article of manufacture of claim 15, wherein computer readable program code configured to expand the sensitive information with the obscuring information is further configured to augment the sensitive information about the subscriber with information about other subscribers and/or randomly-generated information about non-existent subscribers and/or public information about non-subscribers.

17. The article of manufacture of claim 14, wherein the computer readable program code configured to repeatedly provide the repeated search requests to search for the sensitive information is further configured to provide search requests to search for additional information about the subscriber if the sensitive information from the subscriber is found.

18. The article of manufacture of claim 14, wherein the computer readable program code configured to repeatedly provide the repeated search requests to search the network for the sensitive information is further configured to wait between related search requests, and wherein the computer readable program code configured to intermittently provide the intermittent search requests to search the network for the obscuring information is further configured to intermittently provide the intermittent search requests during the wait.

* * * * *